May 25, 1937.                J. W. McNAIRY                2,081,829
                          SYSTEM OF DISTRIBUTION
                           Filed April 29, 1936
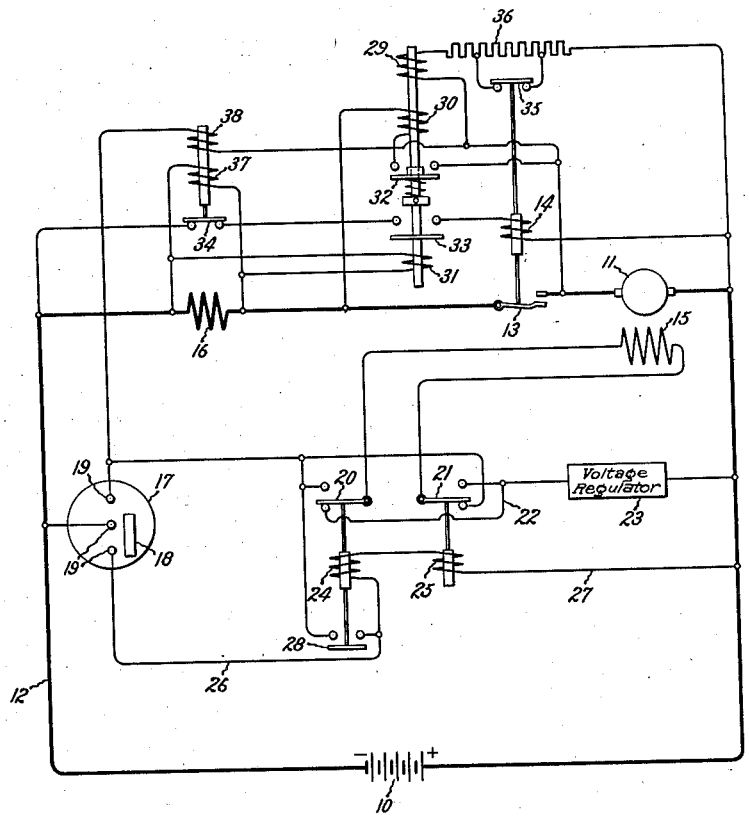
Inventor:
Jacob W. McNairy,
by Harry E. Dunham
His Attorney.

Patented May 25, 1937

2,081,829

UNITED STATES PATENT OFFICE 2,081,829

SYSTEM OF DISTRIBUTION

Jacob W. McNairy, Erie, Pa., assignor to General Electric Company, a corporation of New York Application April 29, 1936, Serial No. 76,927

7 Claims. (Cl. 171—313)

My invention relates to systems of distribution, more particularly to systems for charging a storage battery on a railway car or other vehicle from a generator driven by the car axle, and has for its object simple and reliable means for protecting the system against excessive current and reversed generator voltage conditions.

My invention is particularly useful in systems for charging storage batteries forming a part of air conditioning installations on railway cars. In such installations the generator is usually arranged to operate for both directions of rotation and may, because of high field residual or other causes, build up with reversed polarity when its rotation is reversed, thereby causing a short circuit when the generator is connected to the battery. Moreover, in the event of a short circuit during operation, it is desirable to maintain the generator disconnected from the battery so long as the condition which would result in such a short circuit exists.

In carrying out my invention I provide means for preventing the connection of the generator to the battery in the event that the generator builds up with reversed polarity, together with excessive current responsive means for opening the charging circuit in the event of a short circuit and for maintaining the circuit open so long as these conditions exist. In one form of my invention I provide a relay which is responsive to current to disconnect the generator from the battery in the event of excessive current, and also responsive to the difference between the generator and battery voltages to prevent the connection of the generator to the battery in the event that the polarity of the generator is reversed. This arrangement has the advantage that if the generator should thereafter build up with the correct polarity when its direction of rotation is again reversed, the generator will be automatically connected to the battery for charging operation, whereas with a fused circuit the fuse opens the circuit upon connection of the generator to the battery with reversed polarity, and prevents subsequent operation under all circumstances and conditions, even though the generator may subsequently build up correctly.

For a more complete understanding of my invention reference should be had to the accompanying drawing, the single figure of which shows the storage battery charging system for railway cars embodying my invention.

Referring to the drawing, I have shown my invention in one form as applied to an axle driven generator storage battery charging system such as used with air conditioning equipment on railway cars. The system comprises a storage battery 10 with a direct current generator 11 arranged to be connected to the battery by means of a conductor 12 and a single pole electromagnetically operated switch 13 provided with an operating coil 14. The generator, driven from the car axle, is provided with a shunt field winding 15 and a series field winding 16.

For controlling the direction of excitation of the field winding 15, the system is provided with a suitable speed and direction responsive switch 17 driven with the generator, preferably of the type described and claimed in my Patent No. 1,959,173, dated May 15, 1934. As explained in my aforesaid patent, this switch comprises a rotatably and axially movable bridging contact 18, which cooperates with three spaced contacts 19. By means of a suitable friction device the bridging contact is moved in the direction of rotation of the generator shaft to stand opposite either the lower pair of contacts 19 as shown, or the upper pair for the opposite direction, after which, upon further increase in speed of the generator, the bridging contact is moved axially toward the left as seen in the drawing to connect together the appropriate pair of contacts. When the generator speed decreases to a value below that required for a charging voltage, the bridging contact is moved toward the right to disengage the pair of contacts and thereby open the circuit of the generator field 15.

It will be observed that as shown, the speed and direction switch 17 controls the field 15 through reversing switches 20 and 21. When the segment 18 is moved to engage the upper pair of contacts 19, the field circuit is established through the switches 20 and 21 with the switches in the positions shown in the drawing. This circuit may be traced from one side of the battery through the upper pair of contacts 19, switch 21, and field winding 15, switch 20, conductor 22, and voltage regulator 23, to the opposite side of the battery. For the reverse direction of rotation the coils 24 and 25 of the switches 20 and 21 are energized through conductors 26 and 27 whereby the switches are operated to their uppermost positions, the switch 20 at the same time closing an interlock switch 28 whereby the field winding 15 is connected to the battery for reverse excitation.

The voltage regulator 23 may be of any suitable type responsive to the voltage of the generator 11 and operating to change the amount of a suitable resistance (not shown) in circuit with the field winding 15 so as to maintain a substantially constant predetermined generator voltage. Preferably a regulator is used of the type described and claimed in my copending application, Serial No. 15,500, filed April 9, 1935, assigned to the same assignee as this invention.

For the purpose of connecting the generator to the storage battery when its voltage bears a predetermined relation to the voltage of the storage battery, I provide a relay having two voltage coils 29 and 30 and a reverse current coil 31 operating two switches 32 and 33. Preferably the movable bridging contact of the switch 32 is moved to closed position before the closure of the switch 33, and is spring mounted as shown to allow further movement of the operating armature to close the switch 33. The operating coil 29 is connected across the terminals of the generator 11 while the coil 30 is connected by the switch 32 across the terminals of the charging switch 13. The coil 30 is so connected with respect to the coil 29 that it assists the coil 29 when the generator voltage is greater than the battery voltage but opposes the coil 29 when the generator voltage is less than the battery voltage.

In the operation of the system as thus far described, when the car accelerates and the generator speed increases, the centrifugal switch 17 operates at some predetermined speed to close the circuit of the field winding 15 in a direction to give the required generator polarity. The generator voltage thereupon builds up, and when it reaches a predetermined value the coil 29 is energized sufficiently to close the switch 32, thereby connecting the coil 30 across the terminals of the charging switch 13. The centrifugal switch 17 preferably is adjusted to energize the field winding 15 somewhat before the speed is sufficient to give the desired generator voltage. Assuming a thirty-two volt battery, the generator voltage maintained by the regulator 23 after the generator reaches a predetermined speed may be, for example, thirty-six volts.

Under the conditions assumed, the coil 29 may be arranged to close the switch 32 at twenty-six volts across the generator, and if acting alone to close the switch 33 at thirty-six volts. When the switch 32 closes, however, the coil 30 assists the coil 29 as soon as the generator voltage becomes greater than the battery voltage and operates to effect closure of the switch 33 upon the occurrence of a variable generator voltage depending upon the voltage of the battery. In other words, if the battery voltage is low, the coils will close the switch 33 at a lower value of generator voltage than when the battery voltage is high. Thus with a battery voltage of 26, the switch 33 may be closed, for example, with a generator voltage of 29, whereas with a battery voltage of 32, the switch may be closed with a generator voltage of 33.

The switch 33 closes a circuit for the coil 14 across the battery through a normally closed relay switch 34. The charging switch 13 is thereupon closed by the coil 14 and at the same time an auxiliary switch 35 is opened, removing a short circuit around a portion of a resistance 36 in circuit with the coil 29. The effect of this is to weaken the holding force of the coil 29 so that the switches 32 and 33 can be more easily opened by the reverse current coil 31 in the event of reverse current of a predetermined value.

As shown, the coil 31 is connected across the series field winding 16. It is so connected with respect to the coils 29 and 30 that when energized by charging current it assists the coils 29 and 30 in holding the switches 32 and 33 closed, but when traversed by reverse current from the battery it opposes the coils 29 and 30.

In accordance with my invention I provide the normally closed relay switch 34 in circuit with the coil 14, this relay switch 34 being operated by two coils, a current responsive coil 37 connected across the terminals of the series field winding 16, and a voltage coil 38 connected across the charging switch 13.

The coil 37 is arranged to open the relay switch 34 and thus deenergize the coil 14 and effect the opening of the switch 13 in the event of a predetermined excessive current in the charging circuit, such, for example, as might be caused by a short circuit across the generator or the battery.

Upon the opening of the switch 13 the coil 38 is energized by the difference between the voltages across the generator and the battery. If either the generator or the battery is short circuited, resulting in a low voltage at that point, a correspondingly high voltage from the one not short circuited obviously is applied to the coil 38 whereby the coil holds the switch 34 open as long as this condition exists.

The coil 38 serves also the function of opening the switch 34 in the event of reversed generator polarity, thereby preventing closure of the switch 13. It will be observed that the coil 38 is connected to one side of the switch 13 through the centrifugal switch 17. When the switch 17 closes the coil 38 is energized by the difference between the voltages of the generator and the battery. The voltage required by coil 38 to open the switch 34 is greater than the normal difference between the generator and the battery voltages, however. Consequently, the coil 38 does not open the switch 34 under normal operating conditions. However, if the generator voltage is reversed, then its voltage is in the same direction as the battery voltage, and the sum of the two is applied to the coil 38, whereupon the coil opens the switch 34 and prevents the connection of the generator to the battery by the closing of the switch 13.

When the car is stopped, however, the switch 17 opens the circuit of the coil 38, resetting the switch 34 in its closed position, and if the generator voltage builds up in the correct direction when the car is later operated in the opposite direction the generator will be connected to the battery in the usual manner. Also of course if after reclosure of the switch 34 upon reduction of speed or stopping, the generator should thereafter build up in the correct direction even though its direction of rotation is not reversed, the switch 34 will not be opened, and the generator will be connected to the battery as usual.

While I have shown a particular embodiment of my invention, it will be understood, of course, that I do not wish to be limited thereto since many modifications may be made, and therefore contemplate by the appended claims to cover any such modifications as fall within the true spirit and scope of my invention.

What I claim as new and desire to secure by Letters Patent of the United States is:

1. In combination with a generator of a load switch for connecting said generator in a load circuit, an operating coil for said load switch, a relay switch in circuit with said coil, and a pair of coils individually energized to open said relay switch, one of said coils being responsive to the voltage across said load switch when said load switch is open and the other of said coils being responsive to the current in said circuit when said load switch is closed to open said relay switch and thereby open said load switch upon the occurrence of an excessive current.

2. The combination with a generator arranged for operation in each direction of rotation, a shunt field winding for said generator, a normally open load switch for connecting said generator in a load circuit, an operating coil for said load switch, a normally closed relay switch in circuit with said coil, a pair of coils individually energized to open said relay switch, one of said coils being responsive to the voltage across said load switch when said load switch is open and the other of said coils being responsive to the current in said circuit when said load switch is closed, and a speed direction responsive switch driven by said generator for controlling the energization of said field winding and the energization of the voltage coil of said relay.

3. A storage battery charging system comprising a generator, a charging switch for connecting said generator to a storage battery, an operating coil for said charging switch, relay switching means for controlling said coil, and electromagnetic means responsive to the current in said generator when said charging switch is closed and to the voltage across the terminals of said charging switch when said switch is open for controlling said relay switching means to open said charging switch in response to excessive current and to prevent closure of said switch upon reversed polarity of said generator.

4. A storage battery charging system comprising a generator, connections for connecting said generator in a series charging circuit with a storage battery, a normally open charging switch in said series circuit, an operating coil for said charging switch, a normally closed relay switch in circuit with said coil, and a pair of coils individually energized to open said relay switch, one of said coils being responsive to the voltage across said charging switch when said charging switch is open, and the other of said coils being responsive to the current in said circuit when said charging switch is closed to open said relay switch and thereby open said charging switch upon the occurrence of an excessive current.

5. A storage battery charging system comprising a generator, connections for connecting said generator in a series charging circuit with a storage battery, a normally open switch for closing and opening said circuit, an operating coil for said switch, and means responsive to the current in said circuit when said switch is closed and the voltage across said switch when said switch is open for controlling said operating coil to open said switch upon excessive current and to prevent closure of said switch upon reversed polarity of said generator.

6. A storage battery charging system comprising a generator arranged for operation in either direction, a shunt field winding for said generator, a normally open charging switch for connecting said generator to a storage battery, an operating coil for said charging switch, means responsive to the voltages of said generator and said battery for controlling said switch, a normally closed relay switch in circuit with said coil, a pair of coils individually energized to open said relay switch, one of said coils being responsive to the voltage across said load switch when said load switch is open and the other of said coils being responsive to the current in said circuit when said load switch is closed, and a speed direction responsive switch driven by said generator for controlling the energization of said field winding and the energization of the voltage coil of said relay.

7. A storage battery charging system comprising a generator, a charging switch for connecting said generator to a storage battery, an operating coil for said charging switch, means responsive to the voltages of said generator and said battery for controlling the energization of said operating coil to close said switch upon the occurrence of a predetermined relation between said voltages, a relay switch in circuit with said operating coil and a pair of coils individually energized to open said relay switch, one of said pair of coils being responsive to the voltage across said charging switch when said charging switch is open and the other of said pair of coils being responsive to the current in said generator when said charging switch is closed.

JACOB W. McNAIRY.